US012711748B2

(12) United States Patent
Schwalbe et al.

(10) Patent No.: US 12,711,748 B2
(45) Date of Patent: Aug. 18, 2026

(54) METHOD FOR MONITORING LOGICAL CONSISTENCY IN A MACHINE LEARNING MODEL AND ASSOCIATED MONITORING DEVICE

(71) Applicant: Continental Automotive Technologies GmbH, Hannover (DE)

(72) Inventors: Gesina Schwalbe, Regensburg (DE); Christian Wirth, Niederhöchstadt (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 625 days.

(21) Appl. No.: 18/046,087

(22) Filed: Oct. 12, 2022

(65) Prior Publication Data

US 2023/0111973 A1 Apr. 13, 2023

(30) Foreign Application Priority Data

Oct. 12, 2021 (DE) .................... 10 2021 211 503.9

(51) Int. Cl.
*G06V 10/776* (2022.01)
*G06V 10/82* (2022.01)

(52) U.S. Cl.
CPC ............ *G06V 10/776* (2022.01); *G06V 10/82* (2022.01)

(58) Field of Classification Search
CPC ...... G06V 10/776; G06V 10/82; G06N 5/025; G06N 3/0464; G06N 3/048; G06N 5/045; G06N 3/043; G06N 3/09; G06N 3/042
USPC ..................................... 382/155; 700/47, 48
See application file for complete search history.

(56) References Cited

U.S. PATENT DOCUMENTS

| | | | | |
|---|---|---|---|---|
| 11,574,185 | B2 * | 2/2023 | Choi ...................... | G06N 7/046 |
| 2002/0055809 | A1 | 5/2002 | Westphal | |
| 2016/0328641 | A1 | 11/2016 | AlSaud et al. | |
| 2020/0004439 | A1 * | 1/2020 | Borlick ................. | G06F 3/0683 |
| 2020/0151555 | A1 * | 5/2020 | Kozhaya ................. | G06N 3/08 |
| 2021/0150341 | A1 | 5/2021 | Dalli et al. | |
| 2022/0326023 | A1 * | 10/2022 | Xu .................... | B60W 60/0025 |

(Continued)

FOREIGN PATENT DOCUMENTS

| | | | |
|---|---|---|---|
| DE | 10046007 | C1 | 10/2001 |
| EP | 3493105 | A1 | 6/2019 |
| WO | 03017098 | A1 | 2/2003 |

(Continued)

OTHER PUBLICATIONS

Machine English translation of the German Office Action dated Jun. 30, 2022 for the counterpart German Patent Application No. 10 2021 211503.9 (Year: 2022).*

(Continued)

*Primary Examiner* — Juan A Torres

(57) ABSTRACT

A computer-implemented method monitors the logical consistency of an artificial neural network. Activation data of the artificial neural network, which are produced from input data, is initially read in. The activation data is transferred to at least one trained concept model which is trained to recognize and, if applicable, localize a partial feature of the features contained in the input data and to output a calibrated partial feature mask. The final output data is linked to the partial feature truth values by a fuzzy logic unit to produce a continual logical consistency truth value. The logical consistency truth value is evaluated by an evaluation unit.

15 Claims, 1 Drawing Sheet

(56) References Cited

U.S. PATENT DOCUMENTS

2023/0100014 A1* 3/2023 Duan ................ B60W 60/0025 701/25

FOREIGN PATENT DOCUMENTS

WO 2016178709 A1 11/2016
WO 2021099338 A1 5/2021

OTHER PUBLICATIONS

German Office Action dated Jun. 30, 2022 for the counterpart German Patent Application No. 10 2021 211 503.9.
Laura Von Rueden et al., "Informed Machine Learning—A Taxonomy and Survey of Integrating Prior Knowledge into Learning Systems", IEEE Transactions on Knowledge and Data Engineering, vol. 35, issue 1, Jan. 2023, pp. 614-633, arXiv:1903.12394v3 (2021).
Soumali Roychwdhury et al., "Image Classification Using Deep Learning and Prior Knowledge", The Workshops of the Thirty-Second AAAI Conference on Artificial Intelligence, 2018, pp. 336-342, https://www.aaai.org/ocs/index.php/WS/AAAIW18/paper/view/16575/15588.
Wagner B et al., "Neural-Symbolic Integration for Fairness in AI", CEUR Workshop Proceedings, 2021, 2846, ISSN 1613-0073, http://ceur-ws.org/Vol-2846/paper5.pdf; https://openaccess.city.ac.uk/id/eprint/26151 (2021).
Johannes Rabold et al., "Expressive Explanations of DNNs by Combining Concept Analysis with ILP", Advances in Artificial Intelligence: 43rd German Conference on AI, Bamberg, Germany, Sep. 21-25, 2020, Proceedings Sep. 2020, pp. 148-162, https://doi.org/10.1007/978-3-030-58285-2_11.
Chuan Guo et al., "On Calibration of Modern Neural Networks", Proceedings of the 34th International Conference on Machine Learning, 2017, vol. 70, pp. 1321-1330.
Pang Wei Koh et al., "Concept Bottleneck Models", Proceedings of the 37th International Conference on Machine Learning, 2020, vol. 119, pp. 5338-5348.
Gesina Schwalbe, "Verification of Size Invariance in DNN Activations using Concept Embeddings", Artificial Intelligence Applications and Innovations: 17th IFIP WG 12.5 International Conference, AIAI 2021, Hersonissos, Crete, Greece, Jun. 25-27, 2021, Springer International Publishing, 2021. p. 374-386, DOI:10.1007/978-3-030-79150-6_30, https://fis.uni-bamberg.de/handle/uniba/51284.
Gesina Schwalbe et al., "Concept Enforcement and Modularization as Methods for the ISO 26262 Safety Argumentation of Neural Networks", 10th European Congress on Embedded Real Time Software and System, Toulouse, France, Jan. 2020.
Ruth Fong et al., "Net2Vec: Quantifying and Explaining how Concepts are Encoded by Filters in Deep Neural Networks", 2018 IEEE/CVF Conference on Computer Vision and Pattern Recognition (CVPR), Jun. 2018, DOI:10.1109/CVPR.2018.00910.
Been Kim et al., "Interpretability Beyond Feature Attribution: Quantitative Testing with Concept Activation Vectors (TCAV)", 35th International Conference on Machine Learning, Stockholm, Sweden, 2018, vol. 80 (pp. 2668-2677).
David J C Mackay, "The Evidence Framework Applied to Classification Networks", Neural Computation 4, MIT 720-736 (1992).
Gesina Schwalbe et al., "Structuring the Safety Argumentation for Deep Neural Network Based Perception in Automotive Applications", Computer Safety, Reliability, and Security, SAFECOMP 2020 Workshops, LNCS 12235, pp. 383-394 SAFECOMP 2020, https://doi.org/10.1007/978-3-030-55583-2_29.
Maximillian Henne et al., "Benchmarking Uncertainty Estimation Methods for Deep Learning With Safety-Related Metrics", Workshop on Artificial Intelligence Safety, SafeAI, AAAI, pp. 83-90. 2020.
Chinese Office Action dated Oct. 25, 2025 for the counterpart Chinese Patent Application No. 202211243956.5 and machine translation of same.
Vilem Novak, Jiri Mockor, Irina Perfiljeva/ Mathematical Principles of Fuzzy Logic/ pp. 1-14,41-51. (1999).
Samy Badreddine, Artur D'avila Garcez, Luciano Serafini, Michael Spranger / Logic Tensor Networks / Dec. 23, 2023.
Eleonora Giunchiglia, Mihaela Catalina Stoian, Salman Khan, Fabio Cuzzolin, Thomas Lukasiewicz / ROAD-R: The Autonomous Driving Dataset with Logical Requirements / Oct. 5, 2022.
Zhang Yanbang et al., "Significant Object Detection Based on Texture and Color Features", Computer & Digital Engineering—vol. 49 No 9, 2021 and machine translation of same.
Chinese Office Action dated May 13, 2026 for the counterpart Chinese Patent Application No. 202211243956.5 and machine translation of same.

* cited by examiner

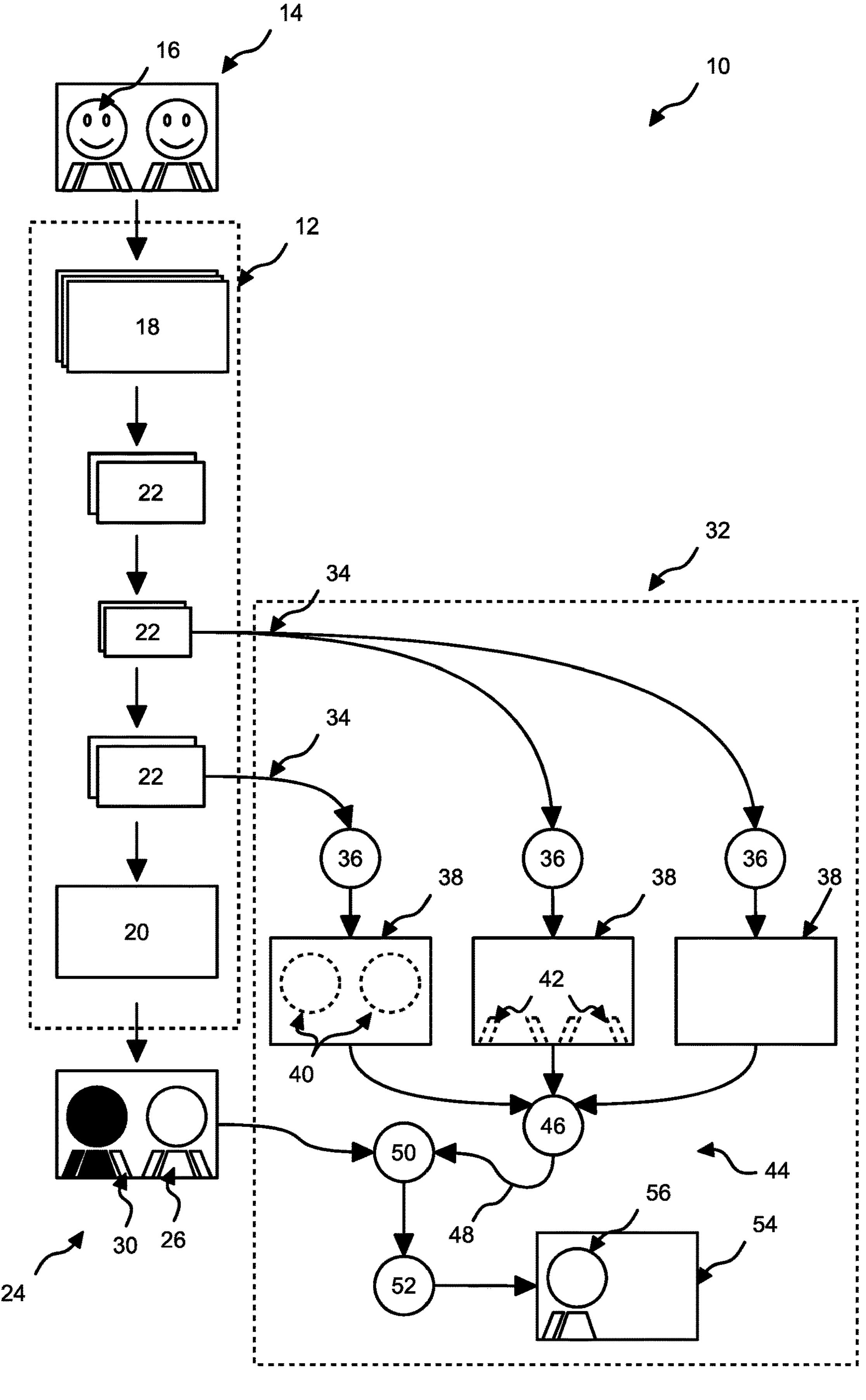
14
16
10
12
18
22
22
32
34
22
34
36
36
36
38
38
38
20
42
40
46
50
44
30
26
48
56
54
24
52

METHOD FOR MONITORING LOGICAL CONSISTENCY IN A MACHINE LEARNING MODEL AND ASSOCIATED MONITORING DEVICE

The present application claims priority to German Patent Application No. 10 2021 211 503.9, filed Oct. 12, 2021, which is hereby incorporated by reference herein.

TECHNICAL FIELD

In general, the invention relates to machine learning models and the monitoring thereof. In particular, the invention relates to trained neural networks in the form that they can be deployed in autonomous traffic applications and the examination of the logical consistency of the output data with the input data.

BACKGROUND

The outputs of deep neural networks (DNNs) can be checked for logical plausibility with the aid of fuzzy logic.

The deployment of fuzzy logic is known, for example, from DE 100 46 007 C1. A fuzzy logic control system made up of expert knowledge is evaluated for a safety appraisal in parallel to the actual flight computer of an aircraft. The fuzzy logic model is only applied directly to interpretable sensor values and does not contain any learned components.

WO 2016/178 709 A1 discloses a plant early warning system. On the basis of correlated data of a plant system, a computer-aided model (which is not specified in greater detail) makes a future prediction regarding predefined safety-relevant key performance indicators (KPIs), which can trigger an alarm in the event of a poor forecast.

Attribution methods, e.g., Layer-wise Relevance Propagation (LRP) are known, by means of which a value is assigned to regions (e.g., pixels of an image file) in the input, which value quantifies the contribution (attribution) of this region to the final output. These attribution values can be used for manual or automated plausibility checking. One or more additional evaluations (or backward evaluations) of the DNN are required for this purpose.

The plausibility can be checked by means of Logic Tensor Networks, which process is known from Wagner et al., 2021, "Neural-Symbolic Integration for Fairness in AI", CEUR Workshop Proceedings, Vol. 2846, California, USA (http://ceur-ws.org/Vol-2846/paper5.pdf). A problem in the form of differentiable fuzzy logic rules is formulated, the predicates of which can be trainable models. The models are trained with the aid of examples such that the truth values of the rules are as high as possible. Here, it is assumed that the outputs of the trained models can be interpreted directly as calibrated probabilities or truth values.

Concept Bottleneck Models are also known, for example from Koh et al., 2020, "Concept Bottleneck Models", Proc. 2020 Int. Conf. Machine Learning, 5338-48. A model is trained to exclusively use predefined, interpretable concepts as an intermediate output. This intermediate output can be used during the runtime for manual validation. Therefore, already trained networks which have been trained in a different way cannot be monitored with this procedure.

Kim et al., 2018, "Interpretability beyond Feature Attribution: Quantitative Testing with Concept Activation Vectors (TCAV)", Proc. 35th Int. Conf. Machine Learning, 80:2668-77, discloses that simple models are trained on the basis of concept labels to correctly associate concepts with vectors in the intermediate output of a trained DNN. These concept vectors can be used in order to measure direct dependencies (attribution) of the output of the corresponding concepts locally and globally, in a similar manner to the attribution methods.

Concept models and logical rules for offline verification are known from Schwalbe et al., 2020, "Concept Enforcement and Modularization as Methods for the ISO 26262 Safety Argumentation of Neural Networks", Proc. 10th European Congress Embedded Real Time Software and Systems, Toulouse, France (https://hal.archives-ouvertes.fr/hal-02442796). Here, the authors demonstrate how complex rules can be formulated for the output of DNNs and concept models. As in the case of Logic Tensor Networks, it is assumed here that the outputs of the DNN and the concept models can be interpreted directly as truth values or calibrated probabilities. Fuzzy logic is not proposed for formulating the rules. The proposed method refers to a verification prior to commissioning and not to online monitoring (i.e., during the runtime).

SUMMARY

The object which forms the basis of the present disclosure is to create a monitoring of machine learning models in real time during the runtime.

The present disclosure creates a computer-implemented method for monitoring the logical consistency of final output data of an artificial neural network which is configured for a classification, classification and localization, object detection, or segmentation of features which are contained in input data, and for outputting, preferably calibrated, final output data which are indicative of the existence and, if applicable, the position of the features in the input data, wherein the method includes:

a) reading in activation data of the artificial neural network, which are produced from the input data, by means of an input interface;

b) transferring the activation data read in in step a) to at least one trained concept model which is trained to recognize and, if applicable, localize a partial feature of the features contained in the input data and to output a, preferably calibrated, partial feature mask, wherein the partial feature mask contains at least one, preferably calibrated, partial feature truth value which is indicative of whether and, if applicable, where the partial feature is contained in the input data;

c) linking the final output data to the partial feature truth value by means of a fuzzy logic unit which determines at least one continual logical consistency truth value therefrom; and d) evaluating the logical consistency truth value obtained in step c) by means of an evaluation unit, wherein, if the logical consistency truth value reaches or falls short of a predefined threshold, the evaluation unit ascertains a logical inconsistency of the final output data in an inconsistency region, wherein the evaluation unit ascertains a logical consistency if the logical consistency truth value does not fall short of the predefined threshold.

The method preferably includes a step e): in the event that no logical consistency of the final output data with the input data was ascertained in step d), at least one of the following steps is performed:

- outputting of an uncertainty measure, optionally localized in the inconsistency region;
- performing of a redundant evaluation of the input data;
- activating of further control mechanisms for artificial neural networks;
- activating of additional sensors;

adopting of a safe state; and/or displaying of a consistency error.

It is preferred that, in step a), the activation data are read in from an output layer and/or at least one intermediate layer of the artificial neural network.

It is preferred that, in step b), activation data are transferred from merely one layer of the artificial neural network to a concept model.

It is preferred that, in step b), the trained concept model has been trained by means of a linear machine learning method as a linear machine learning model.

It is preferred that, in step b), the activation data are transferred to a plurality of trained concept models, wherein the partial feature masks of each trained concept model are linked to one another in order to obtain a total partial feature mask with total partial feature truth values.

It is preferred that, in step c), the final output data are linked to the total partial feature truth values by means of the fuzzy logic unit.

It is preferred that, in step c), the logical consistency truth value is determined by applying an implication link to the (total) partial feature mask and the final output data, with the proviso that the (total) partial feature mask implies at least regions of the final output data.

It is preferred that the input data contain input image data, wherein the DNN is configured for a classification, classification and localization, object detection, or segmentation of the input image data into feature regions, wherein the feature regions contain recognized features which characterize a semantic concept, wherein the, preferably calibrated, final output data contain the segmented feature regions.

It is preferred that, in step a), activation data in the form of activation values or activation maps of the DNN, which are produced in each case from the input image data, are read in by means of the input interface.

It is preferred that, in step b), the trained concept model is trained to recognize and, if applicable, localize a partial feature region of the feature regions contained in the input image data and to output a, preferably calibrated, partial feature mask, wherein the partial feature mask contains at least one region of, preferably calibrated, continual partial feature truth values which are indicative of whether and where the partial feature region is contained in the input image data.

It is preferred that, in step c), the final output data are linked pixel-by-pixel to the partial feature truth values by means of the fuzzy logic unit which determines a consistency truth value map of continual logical consistency truth values therefrom.

It is preferred that, in step d), the consistency truth value map obtained in step c) is evaluated by means of the evaluation unit, wherein, in a region of the consistency truth value map in which the logical consistency truth value reaches or falls short of a predefined threshold, the evaluation unit ascertains a logical inconsistency of the final output data with the input image data within the inconsistency region, wherein the evaluation unit ascertains a logical consistency within a region of the consistency truth value map, if the logical consistency truth values in this region do not fall short of the specified threshold.

It is preferred that the input image data contain an environment situation of a motor vehicle, in particular a traffic situation with at least one person, wherein the DNN is configured for a classification, classification and localization, object detection, or segmentation of the input image data into feature regions which contain persons, traffic signs and/or road markings, wherein the, preferably calibrated, final output data contain the segmented feature regions.

It is preferred that, in step b), a plurality of trained concept models is trained to recognize and, if applicable, localize partial features of the persons, traffic signs and/or road markings of the feature regions contained in the input image data and to output a, preferably calibrated, partial feature mask.

It is preferred that, in step e), at least one additional sensor or one additional camera is activated, which is configured to detect persons, traffic signs and/or road markings; and/or input image data are detected again and/or evaluated again, preferably by means of another method.

The present disclosure includes a computer-implemented method for recognizing and, if applicable, localizing objects and/or persons in a traffic situation, wherein input data are processed by a machine learning model, preferably a DNN, which is trained for a classification, classification and localization, object detection, or segmentation of the input data, in order to obtain, preferably calibrated, final output data; wherein a previously described method is performed, in parallel or a temporally subordinate manner, by means of a monitoring device in order to obtain a consistency truth value map; wherein a redundant, supplementary and/or renewed detection and/or evaluation of the input data is/are carried out as a function of the consistency truth value map.

The present disclosure includes a monitoring device for monitoring the logical consistency of a machine learning model, preferably of a DNN, wherein the monitoring device includes an input interface, at least one trained concept model, a fuzzy logic unit and an evaluation unit, wherein the monitoring device and the components thereof are adapted to perform a previously described method.

The present disclosure includes a system for recognizing and, if applicable, localizing objects and/or persons in a traffic situation, wherein the system includes a sensor device configured for detecting input data, a machine learning model configured for recognizing objects and/or persons, preferably a DNN, and a preferred monitoring device for monitoring the machine learning model.

The present disclosure includes a motor vehicle having such a system.

The present disclosure includes a computer-readable storage medium, data carrier signal or computer programming product, having commands which, when executed by a computer, prompt the latter to perform one, several or all of the steps of a method described herein.

The present disclosure makes it possible to monitor the logical plausibility of a perception DNN during the runtime and in real time. The monitor can be used for safeguarding.

The monitoring presented here or the results thereof can be interpreted by human users. The safety of the monitor and of the monitored system can therefore be demonstrated more easily, in particular if complex machine learning models, such as DNNs or convolutional DNNs, are being monitored.

The processing of the intermediate states or intermediate outputs of the monitored model as well means that it is possible to measure the inner logic of the model and the reliability and robustness thereof directly for the first time. Overall, the uncertainty of the outputs which, otherwise, can only be evaluated statistically can be reduced. In the present case, a pedestrian or persons can therefore be recognized more reliably.

The monitoring system is independent of the model to be monitored. It can therefore be trained separately and for different intended applications, in particular with a smaller amount of training data. Further, the separate training is more stable compared to the systems previously trained in an integrated manner with the model to be monitored.

The monitoring system contains (predicate) logical rules which can be flexibly adjusted. Further, the monitoring system preferably uses calibrated outputs. The outputs of the model to be monitored and of the monitoring system can be used directly as truth values or probabilities. The truth values are preferably not discrete but continual and follow the principles of fuzzy logic. The calibration of the outputs (for which methods are known per se) makes it possible for an output having a high confidence compared to an output having a lower confidence based on the same test data set to actually be accurate more frequently as well.

The measures presented herein have a significantly lower computational intensity. The monitoring system can be trained prior to being deployed and then connected to the machine learning model to be monitored in order to monitor the latter. Consequently, the training of the monitoring system is not carried out during the runtime but in preparation therefor.

However, unlike the monitoring measures known to date, it is in particular possible to monitor a machine learning model during the runtime and in real time with the monitoring system described herein due to the use of trained concept models and/or fuzzy logic truth values.

Many areas of automation such as, for example, autonomous driving require highly accurate processing methods for environment detection from sensor data such as, e.g., cameras. To date, deep convolutional neural networks have been used for this purpose.

In the case of automation, the environment detection function is, as a general rule, safety-critical for the user and the environment. Therefore, certain safety standards are to be achieved and complied with in corresponding applications such as autonomous driving. Such a measure is to create the system design correspondingly, for example by redundancy, function monitoring, emergency routines or combinations thereof. The present disclosure provides a functional monitoring for machine learning models for environment detection (for example by DNNs) which can only be realized with difficulty or cannot be realized at all with conventional methods. The background to this, inter alia, is the complexity and diversity of natural environments as they occur in autonomous driving, as well as due to the complex and statistical nature of DNNs. Therefore, strong, easy-to-validate (i.e., interpretable) monitors are required for safeguarding. These monitors can sound an alarm, for example, or activate further measures for environmental detection/evaluation as soon as the DNN shows undesirable behavior according to the assessment of the monitoring system.

No uniform monitoring concepts have yet been established in the new field of DNNs for perception. In general, monitors for DNNs in perception are independent models (also called meta-classifiers) which predict the reliability of a final output on the basis of the behavior of the DNN. There are numerous behavioral aspects which can be enlisted during the monitoring, such as a direct monitoring of a final output (traditional monitoring), a monitoring of the intermediate outputs, a monitoring of an uncertainty output/estimation, a monitoring of the dependencies of the final output of inputs/intermediate outputs (attribution, by way of example: which image region was particularly relevant for the recognition of a person), a monitoring of a statistically coupled output (likewise a traditional error indicator), wherein for several end outputs, the errors of which are statistically coupled, merely one of the outputs is monitored (examples: several outputs such as segmentation and depth estimation with the same backbone or parallel trained autoencoder).

DNNs are machine-learned functions in which it is not, as a general rule, possible to directly control which knowledge has been learned (i.e., is coded in the function specification). The visible intermediate outputs of DNNs which contain deduced information about an input are, as a general rule, high-dimensional and, for the most part, cannot be directly interpreted by humans: which points or dimensions in the intermediate output space correspond to a semantic (i.e., linguistically describable) concept such as “eye”, “hand”, “leg”, requires a complex analysis as a general rule.

Methods which associate semantic concepts with vectors in the input space are known from the aforementioned publication by Kim et al. This is also referred to as concept analysis. In this case, on the basis of given examples regarding a (semantic) concept such as, for instance, “arm”, “leg”, etc., a simple linear model is machine learned, which can predict from the intermediate output of the DNN whether the concept is present in the input. The normal vector of this concept model then serves as a vector which is associated with the concept. One idea of the present disclosure is to also apply such methods to complex object recognition.

The solution described herein therefore not only uses the final output, but also intermediate outputs in order to determine the plausibility/logical consistency of the output. Temporal consistency of the final output, consistency regarding small transformations, proximity to the next decision limit (e.g., via uncertainty outputs) and/or the leaving of the validity region of the DNN (“out-of-distribution detection”) can be used.

The method and the system can also be used with DNNs which have already been trained, without the latter having to be further trained or retrained themselves.

In contrast to the known methods, the system and method presented herein allow more complex logical rules to be taken into account such as, for instance, the question of whether only regions in the proximity of the pedestrian have contributed to his/her recognition, or whether there have also been influences from image regions without a logical reference to the pedestrian. A further example can be the question of whether the recognition of a pedestrian is accompanied by the recognition of specific semantic indicators as partial features (e.g., body parts), and whether the spatial arrangement thereof can correspond to a typical anatomy of a pedestrian.

Further, with the measures described herein, the influence of complex logical rules can be investigated and taken into account during the consistency assessment. If, for example, a pedestrian is recognized by the DNN, the monitoring system can determine, on the basis of the activation data of the DNN, whether and, if applicable, what influence, for example, the concept “head” had on the final output. Thus, inconsistencies can be uncovered and suitable countermeasures can be taken.

The present disclosure relates to a monitor for DNNs which examines the plausibility of the outputs and intermediate outputs on the basis of predefined logical rules in real time during the runtime. In this case, the basic idea is to formulate the rules as fuzzy logic rules and, indeed, with the DNN and subsequently added concept models as predicates, wherein both DNN and concept model outputs are calibrated beforehand in order to be able to be interpreted cleanly as truth values. During the runtime, the truth value of the rules is then monitored.

It should be noted that the execution of the monitoring system and method is described, by way of example, on the basis of a pedestrian recognition. However, the basic idea can be transferred to other applications.

Fuzzy logic rules which represent a safety requirement are initially formulated. Linguistically, such a rule could read: "If a head or a limb (arm, leg) has been recognized with a high level of confidence, an associated pedestrian should also be recognized with a high level of confidence."

In logical terms, the rule is that, starting from a quantity M of possible object positions m, the existence of a pedestrian F is implied, if a head, an arm or a leg have been recognized by the DNN and at least one of these belongs to the pedestrian. In formal notation, this can be represented as (M, m ∈ M): (ActualHead(m) v ActualArm(m) v ActualLeg (m))→(∃F∈M: ActualPedestrian(F) IsPartOf(m, F)). The definition of the monovalent predicates (ActualHead, . . . ) is taken from the perception of the environment.

For predicates which are not already covered by the output of the DNN (example: ActualPedestrian), concept models Kc are trained, for which merely a few specially labeled training data are required. In this case, a calibration method can be used directly during training, if necessary, in order to guarantee correct calibration of the concept model. A concept model is trained, for example, for the concept "head", which means that the concept model can easily distinguish between heads and non-heads and also localize where the head is located in an image. The same is performed with the other concept models for arm and leg.

The calibration error of DNN and concept models is measured. If necessary, the outputs of DNN and concept models can be calibrated instead of during training in an additional training phase in order to be able to use the outputs of the concept models as fuzzy truth values (e.g., by means of temperature scaling).

The predicates are then preferably defined as a combination of the associated DNN output, e.g., for image x and object recognizer D as well as the associated concept model output.

An at least partially standard definition of the further predicates is also conceivable. If necessary, these can be represented by further DNNs specifically trained for this purpose. The predicate "IsPartOf" can be defined, for example, by an overlap measure.

The logical rules are implemented by means of operators from a t-norm fuzzy logic. This is a function which receives the values of the predicates and outputs a single truth value in the interval of [0; 1]. Examples of t-norm fuzzy logics used are Gödel or minimum logic, Goguen or product logic, or Łukasiewicz logic.

Fuzzy logic, sometimes also referred to as soft logic or many-valued logic, includes mathematical methods in order to be able to work with graded truth values, i.e., to be able to evaluate the truth value of a rule or to draw logical conclusions. A partial area is the t-norm fuzzy logic used here, which can work on continual truth values between 0 and 1. Many models with continual inputs can be modeled with the aid of rules formulated in fuzzy logic.

The system determines, based on the DNN data, the outputs of the concept models and the other predicates, a threshold, as of which the truth value of a rule is considered too low and a logical inconsistency is determined. This can be determined, e.g., by testing the monitor quality at different thresholds on a test data set.

In the area of environmental perception, relevant logical rules can be, e.g.: "If a human body part can be seen, an associated human being is also to be expected". To date, such rules have merely been trained directly into the DNN as prior knowledge.

In contrast, in the case of the solution presented here, the monitor or the monitoring system regarding a fuzzy logic formula is downstream of the DNN in the overall system. The evaluation is carried out by the monitor for an input (e.g., a frame) in that the monitor receives, as the input, the outputs of the DNN, the outputs of the generated concept models, as well as the outputs of any other modules, the calculation specification of which has been incorporated as predicates.

The concept models can be efficiently evaluated in parallel with the DNN. The input values of the monitor can be used like a lookup table in order to determine values of predicates in the monitor formula. An evaluation unit evaluates the associated fuzzy logic formula and outputs a truth value. If it is ascertained in the evaluation that the truth value falls short of the threshold, different measures can be instigated by the monitor as desired.

An alarm can be triggered, for example. Further, it is conceivable that an uncertainty measure (if applicable, locally) becomes too high. With regard to autonomous driving, it is preferable to switch on a redundant (possibly more expensive, in other words more computationally intensive) evaluation of the environmental sensor data in order to add these to later estimates. Further (local, possibly more computationally intensive) controls of the DNN output can also be activated. A further possibility is that the system adopts a safe state, in particular until such time as the safety is otherwise confirmed. Finally, it is also conceivable to ask the driver to intervene by means of a display or other information.

Machine learning models can be made interpretable with the solution described herein. In addition, the solution can be easily adapted. The monitor is independent of the system to be monitored and can thus be trained independently, without adversely affecting the training of the system to be monitored. Previously unutilized findings or data from deep neural networks can be utilized. The calibration allows the DNN outputs (both intermediate and final outputs) to be used directly as truth values in the concept models and/or the fuzzy logic rules. The solution presented herein is not very computationally intensive and can therefore be utilized without a significant time delay, i.e., during the runtime and in real time. The concept models are preferably designed as linear machine learning models such that only a small amount of additional data (compared to the system to be monitored) are required for training.

In addition to autonomous driving, other applications such as medical image processing, robotics and computer vision can be considered.

BRIEF DESCRIPTION OF THE DRAWINGS

Exemplary embodiments will now be explained in more detail on the basis of the attached schematic drawing. Therein, the only FIGURE, FIG. 1, shows an embodiment of a system for pedestrian recognition according to the exemplary embodiments.

DETAILED DESCRIPTION

FIG. 1 shows a system 10 for recognizing pedestrians in a traffic situation. The system 10 includes a deep convolutional neural network (DNN) 12 which has been trained for a semantic segmentation of input image data 14. The input image data 14 can have been recorded by a camera of a motor vehicle (not depicted in more detail here). The input image data 14 as input data include, for example, representations of pedestrians 16 in a traffic situation in the environment of the motor vehicle.

The DNN 12 includes an input layer 18 (which can have several sublayers, for example by color channel or function), an output layer 20 and at least one intermediate layer 22. The DNN 12 is embodied and trained in the inherently known way, so this is not explained in more detail here. It should be noted that the DNN 12 can actually also contain a different number of intermediate layers 22. Further, depending on the intended application, the layers 18, 20, 22 can also have a different design to that described herein or depicted in the figure.

The DNN 12 is additionally calibrated. The DNN 12 outputs a semantic segmentation of the input image data 14 as final output data 24, wherein the final output data 24 can be used as truth values for a fuzzy logic evaluation due to the calibration.

The final output data 24 contain, for example, a fully recognized pedestrian 26 and a region in which merely one arm 30 has been recognized, although it is clear from the input image data 14 that two pedestrians are present.

The final output data 24 contain semantic features such as the pedestrian 26 and also information regarding the regions in which the pedestrian 26 is located in the input image data 14. Usually, the evaluation would be concluded here.

The system 10 includes a monitoring device 32. The monitoring device 32 is configured to recognize and, if applicable, localize logical inconsistencies in the final output data 24.

The monitoring device 32 includes an input interface 34. The input interface 34 is joined to one or more of the input, output and/or intermediate layers 18, 20, 22. The input interface 34 reads in activation data of each joined layer 18, 20, 22. The activation data includes the activation values of the respective layers 18, 20, 22. The activation data can contain the weights and the bias vector, if applicable.

The monitoring device 32 further comprises at least one concept model 36. The concept model 36 is preferably a simple linear machine learning model which is trained to recognize partial features of the features determined by the DNN 12.

Each concept model 36 is joined via the input interface 34 to a layer 18, 20, 22 of the DNN 12. Each concept model 36 is preferably joined to merely one layer 18, 20, 22. It is also possible that one or more layers 18, 20, 22 are joined to more than one concept model 36. Not all of the layers 18, 20, 22 have to be joined to the monitoring device 32. It can be determined experimentally which concept model 36 is joined to which layer 18, 20, 22.

Here, the DNN 12 is configured to recognize pedestrians. The concept model 36 is, consequently, preferably configured to recognize relevant partial features, that is to say (body) parts of pedestrians.

The monitoring device 32 includes, for example, three concept models 36, of which a first concept model is trained to recognize a head. A second concept model is trained to recognize arms. A third concept model can be trained to recognize legs.

The concept models 36 have been trained such that a classification is possible as to whether the partial feature detected by the concept model 36 is present or not. The concept model 36 is further configured to localize the partial features.

Each concept model 36 receives, as input data, the activation data read in by the input interface 34 and processes the data into a partial feature mask 38 as output data.

Each partial feature mask 38 contains partial feature truth values which are indicative of the presence of the specific partial feature in a specific region of the input image data 14. The partial feature truth values are adjusted for the further processing by fuzzy logic.

For example, the respective partial feature mask 38 can display a head region 40 or arm region 42. It is also possible that a partial feature mask 38 displays that the corresponding partial feature is not contained in the input image data 14 (for example, legs).

The monitoring device 32 further includes a fuzzy logic unit 44. The fuzzy logic unit 44 is configured to form logical links between truth values.

The fuzzy logic unit 44 contains a merging link 46. The merging link 46 links the partial feature masks 38, for example via a pixel-by-pixel OR link, with each other to produce a total partial feature mask 48. The pixel-by-pixel OR link is formed according to the selected fuzzy logic used, for example as a maximum from the first and second truth value (corresponds to Gödel logic).

In the event of pedestrian recognition, the partial feature masks 38 for head, arms and legs are combined by a pixel-by-pixel OR link by the fuzzy logic unit 44. This ideally results in a total partial feature mask 48, in which the pedestrian or the latter's body parts are combined again to produce a complete pedestrian. It is clear that this does not always work flawlessly in practice.

The fuzzy logic unit 44 further contains an implication link 50. The implication link 50 determines a pixel-by-pixel truth value for the implication that the total partial feature mask 48 implies the semantic features in the final output data 24. The implication link 50 results in Gödel logic in the maximum of 1 minus the first truth value (truth values of the total partial feature mask 48) and the second truth value (truth values of the final output data 24). The truth value resulting from the implication link 50 is referred to as a logical consistency truth value and can assume values in the interval of [0; 1]. The logical consistency truth value is a measure of the fact that the final output data 24 are in themselves consistent.

The result of this procedure is that, during pedestrian recognition, in those regions in which the DNN 12 has recognized a pedestrian, the pixel-by-pixel logical consistency truth value is high because the implication link 50 is true rather than false. On the other hand, the pixel-by-pixel logical consistency truth value is low in those regions in which the total partial feature mask 48 has high truth values (because body parts have been recognized), whereas no pedestrian has been detected in the corresponding regions in the final output data 24, i.e., the truth value for the concept "pedestrian" is low.

It should be noted that the fuzzy logic unit 44 can contain further rules which are worded as predicates, depending on which traffic situation is to be processed. For example, different basic shapes, colors and characteristic lines of traffic signs can be introduced into the monitoring device 32, in particular the concept model 36 and the fuzzy logic unit 44.

Due to different dimensions (e.g., height and width in each case in pixels, color channels, etc.) of the data output by the concept models 36 and of the final output data 24, an adjustment of the dimensions can be carried out, for example by a preferably bilinear upscaling, prior to the evaluation by the fuzzy logic unit 44.

The monitoring device 32 includes an evaluation unit 52. The evaluation unit 52 contains a predetermined threshold. The evaluation unit 52 is configured to process the consistency truth value map 54 created by the implication link 50. In those regions of the consistency truth value map 54 in which the threshold is reached or fallen short of by the logical consistency truth value, a logical inconsistency in the form of an inconsistency region 56 is ascertained.

If the inconsistency has been ascertained by the evaluation unit 52, different measures can be taken. For example, a renewed image acquisition can be carried out by the camera and these can be evaluated again. It is also conceivable that additional sensors, for example ultrasonic sensors, are activated in order to detect the pedestrians. It is also conceivable that an (emergency) braking or a slow-speed mode is initiated. It is further possible to draw the attention of the driver to a possible danger by a display or the like.

All in all, it is possible to evaluate a traffic situation thanks to the separate execution of the DNN 12 and monitoring device 32 and, parallel thereto, to determine the logical consistency of the final output data 24 with the input image data 14. Preferably calibrated linear machine learning models as concept models 36 in combination with a fuzzy logic unit 44 make it possible to rapidly check consistency which can be performed during the runtime and in real time; a possibility which has not existed to date.

The invention claimed is:

1. A computer-implemented method for monitoring a logical consistency of an artificial neural network which is configured for a classification, classification and localization, object detection, or segmentation of features which are contained in input data, and for outputting final output data which are indicative of the existence and, if applicable, a position of the features in the input data, the method comprising:

(a) reading in activation data of the artificial neural network, which are produced from the input data, by an input interface;

(b) transferring the activation data read in (a) to at least one trained concept model which is trained to recognize and, if applicable, localize a partial feature of the features contained in the input data, and to output a partial feature mask, wherein the partial feature mask contains at least one partial feature truth value which is indicative of whether and, if applicable, where the partial feature is contained in the input data;

(c) linking the final output data to the partial feature truth value by a fuzzy logic unit which determines at least one continual logical consistency truth value therefrom;

(d) evaluating the at least one continual logical consistency truth value obtained in (c) by an evaluation unit, wherein, if the at least one continual logical consistency truth value reaches or falls short of a predefined threshold, the evaluation unit ascertains a logical inconsistency of the final output data in an inconsistency region, wherein the evaluation unit ascertains a logical consistency if the at least one continual logical consistency truth value does not fall short of the predefined threshold; and (e) in the event that no logical consistency of the final output data with the input data was ascertained in (d), activating additional sensors or controlling a vehicle component.

2. The method according to claim 1, further comprising in (e) performing, at least one additional action of the following:

outputting an uncertainty measure, optionally localized in the inconsistency region;

performing a redundant evaluation of the input data;

activating further control mechanisms for the artificial neural network;

adopting a safe state; or displaying a consistency error.

3. The method according to claim 1, wherein in (a), the activation data are read in from an output layer and/or at least one intermediate layer of the artificial neural network.

4. The method according to claim 1, wherein in (b), the activation data are transferred from one layer of the artificial neural network to the at least one trained concept model.

5. The method according to claim 1, wherein in (b), the at least one trained concept model has been trained by a linear machine learning method as a linear machine learning model.

6. The method according to claim 1, wherein in (b), the activation data are transferred to a plurality of trained concept models, wherein the partial feature mask of each trained concept model is linked to one another in order to obtain a total partial feature mask with total partial feature truth values, wherein in (c), the final output data are linked to the total partial feature truth values by the fuzzy logic unit.

7. The method according to claim 6, wherein in (c), the at least one continual logical consistency truth value is determined by applying an implication link to one of the partial feature mask or the total partial feature mask and the final output data, with a proviso that the one of the partial feature mask or the total partial feature mask implies at least regions of the final output data.

8. The method according to claim 1, wherein the input data contain input image data, wherein the artificial neural network is configured for a classification, classification and localization, object detection, or segmentation of the input image data into feature regions, wherein the feature regions contain recognized features which characterize a semantic concept, wherein the final output data contain the segmented feature regions, and wherein in (a), the activation data, in the form of activation values or activation maps of the artificial neural network, which are produced in each case from the input image data, are read in by the input interface;

in (b), the at least one trained concept model is trained to recognize and, if applicable, localize a partial feature region of the feature regions contained in the input image data and to output the partial feature mask, wherein the partial feature mask contains at least one region of the at least one continual partial feature truth value which are indicative of whether and where a partial feature range is contained in the input image data;

in (c), the final output data are linked pixel-by-pixel to the at least one continual partial feature truth value by the fuzzy logic unit which determines a consistency truth value map of the at least one continual logical consistency truth value therefrom; and in (d), the consistency truth value map obtained in (c) is evaluated by the evaluation unit, wherein, in a region of the consistency truth value map in which the at least one continual logical consistency truth value reaches or falls short of a predefined threshold, the evaluation unit ascertains a logical inconsistency of the final output data with the input image data within the inconsistency region, wherein the evaluation unit ascertains a logical consistency within a region of the consistency truth value map if the at least one continual logical consistency truth value in this region do not fall short of the predefined threshold.

9. The method according to claim 8, wherein the input image data contain an environment situation of a motor vehicle, in particular a traffic situation with at least one person, the artificial neural network is configured for a classification, classification and localization, object detection, or segmentation of the input image data into feature regions which contain persons, traffic signs and/or road markings, the final output data contain the segmented feature regions, and wherein in (b), a plurality of trained concept models are trained to recognize and, if applicable, localize partial features of the persons, traffic signs and/or road markings of the feature regions contained in the input image data, and to output the partial feature mask.

10. The method according to claim 9, wherein at least one additional sensor or one additional camera is activated, which is configured to detect persons, traffic signs and/or road markings; and/or input image data are detected again and/or evaluated again, by another method.

11. A computer-implemented method for recognizing and, if applicable, localizing objects and/or persons in a traffic situation, wherein input data are processed by a machine learning model which is trained for a classification, classification and localization, object detection, or segmentation of the input data, in order to obtain final output data;

wherein a method according to claim 1 is performed, in parallel or a temporally subordinate manner, by a monitoring device in order to obtain a consistency truth value map; and wherein a redundant, supplementary and/or renewed detection and/or evaluation of the input data is/are carried out as a function of the consistency truth value map.

12. A monitoring device for monitoring the logical consistency of a machine learning model, wherein the monitoring device comprises components including the input interface, the at least one trained concept model, the fuzzy logic unit and the evaluation unit, wherein the monitoring device and the components thereof are configured to perform a method according to claim 1.

13. A system for recognizing and, if applicable, localizing objects and/or persons in a traffic situation, wherein the system comprises a sensor device configured for detecting the input data, the machine learning model configured for recognizing objects and/or persons and the monitoring device according to claim 12 for monitoring the machine learning model.

14. A motor vehicle having a system according to claim 13.

15. A non-transitory computer-readable storage medium comprising commands which, when executed by a computer;

(a) read in activation data of an artificial neural network via an input interface, the artificial neural network being configured for a classification, classification and localization, object detection, or segmentation of features which are contained in input data, and for outputting final output data which are indicative of the existence and, if applicable, a position of the features in the input data, the activation data being produced from the input data;

(b) transfer the activation data read in (a) to at least one trained concept model which is trained to recognize and, if applicable, localize a partial feature of the features contained in the input data, and to output a partial feature mask, wherein the partial feature mask contains at least one partial feature truth value which is indicative of whether and, if applicable, where the partial feature is contained in the input data;

(c) link the final output data to the partial feature truth value by a fuzzy logic unit which determines at least one continual logical consistency truth value therefrom;

(d) evaluate the at least one continual logical consistency truth value obtained in (c) by an evaluation unit, wherein, if the at least one continual logical consistency truth value reaches or falls short of a predefined threshold, the evaluation unit ascertains a logical inconsistency of the final output data in an inconsistency region, wherein the evaluation unit ascertains a logical consistency if the at least one continual logical consistency truth value does not fall short of the predefined threshold; and (e) in the event that no logical consistency of the final output data with the input data was ascertained in (d), activating additional sensors or controlling a vehicle component.

* * * * *